Figure 1:
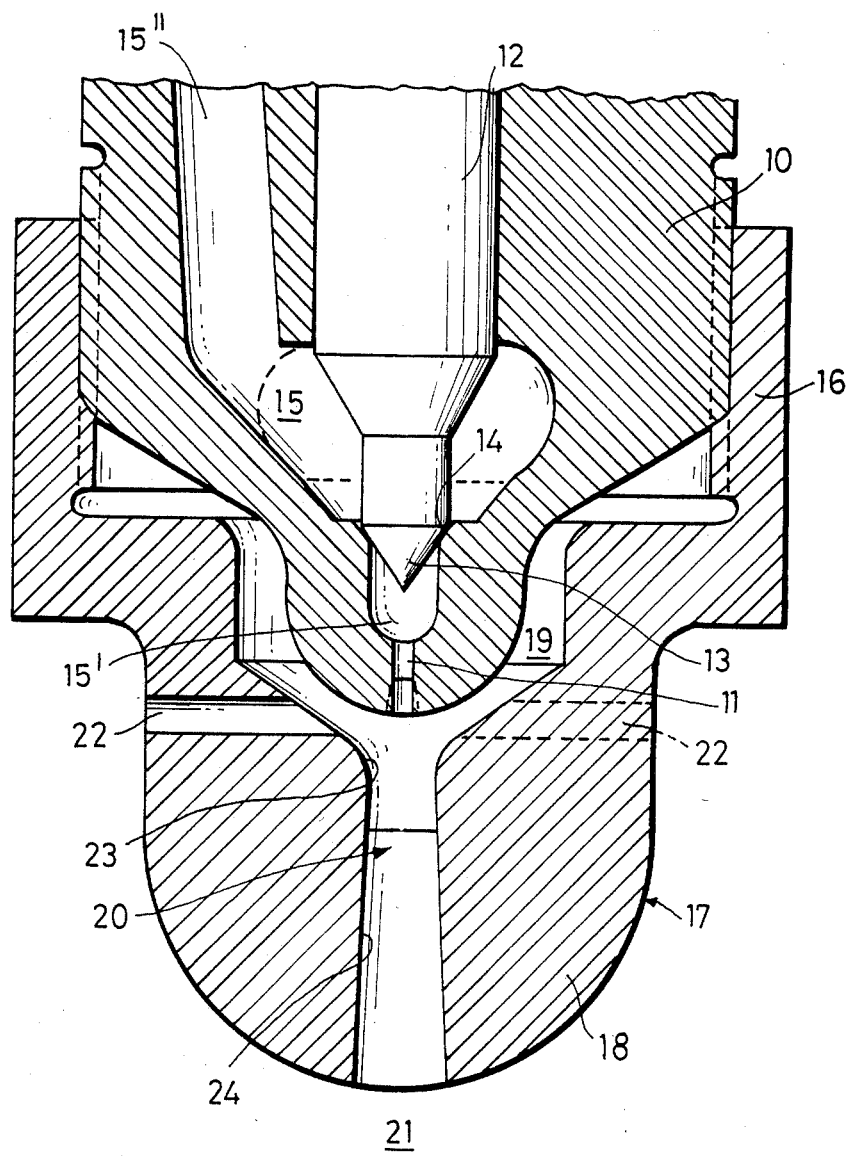

United States Patent [19]

Wiegand

[11] Patent Number: 4,566,634
[45] Date of Patent: Jan. 28, 1986

[54] INJECTION DEVICE FOR A DIESEL ENGINE

[75] Inventor: Herbert Wiegand, Cologne, Fed. Rep. of Germany

[73] Assignee: Deutsche Forschungs- und Versuchsanstalt fur Luft- und Raumfahrt e.V., Bonn, Fed. Rep. of Germany

[21] Appl. No.: 529,978

[22] Filed: Sep. 7, 1983

[30] Foreign Application Priority Data

Sep. 21, 1982 [DE] Fed. Rep. of Germany ....... 3234829

[51] Int. Cl.$^4$ ............................................ F02M 61/16
[52] U.S. Cl. .................................. 239/410; 123/585; 239/533.12
[58] Field of Search ......................... 123/472, 478, 585; 239/5, 8, 407–410, 424, 434.5, 533.2–533.12, 584, 585

[56] References Cited

U.S. PATENT DOCUMENTS

| | | | |
|---|---|---|---|
| 2,231,937 | 2/1941 | Meyer et al. | 239/533.3 X |
| 4,069,978 | 1/1978 | El Moussa | 239/533.2 |
| 4,177,948 | 12/1979 | Schaffitz et al. | 239/533.3 |
| 4,235,210 | 11/1980 | Sumiyoshi et al. | 239/404 X |
| 4,434,766 | 3/1984 | Matsuoka et al. | 123/472 |

FOREIGN PATENT DOCUMENTS 341105  1/1931  United Kingdom ........... 239/533.12

*Primary Examiner*—Andres Kashnikow
*Attorney, Agent, or Firm*—Spensley Horn Jubas & Lubitz

[57] ABSTRACT

The injection device has a nozzle body (10) with a movable valve needle (12). At the front end of the nozzle body (10) there is the discharge nozzle (11). The front end of the nozzle body (10) is surrounded by an ejector attachment (17) which has a suction chamber (19). An ejector duct (20) with a mixing nozzle (23) and a diffuser (24) goes from the suction chamber (19) into the fuel chamber (21). Through air ducts (22) opening laterally into the suction chamber (19), air is drawn out of the fuel chamber (21) by the fuel jet leaving the discharge nozzle (11). This air mixes in the driving jet with the fuel, so that at the base of the driving jet there is already an intensive mixture formation.

19 Claims, 3 Drawing Figures

INJECTION DEVICE FOR A DIESEL ENGINE

The invention relates to an injection device for a diesel engine, in particular with direct injection, with a nozzle body which has a duct that can be blocked and released by a valve needle that is controlledly movable, which duct opens into at least one discharge nozzle.

In diesel engines the fuel is injected under high pressure into the fuel chamber in which is the air charge that has previously been compressed and hence heated to a high temperature. To ensure a good mixing of the fuel with the air, the injection is carried out by single- or multi-holed nozzles. The mixture formation can be helped by additional air movement which is achieved by the special shaping of the fuel chamber. It has thereby been seen that it is mainly the jet peak of the fuel jet that is concerned with the interchange of pulse and material betwen the air and the fuel. The effect of this is that the mixing cannot be improved by simply increasing the injection pressure. Tests have shown that an increase the jet peak speed.

With the known injection devices, the sudden injection of the fuel jet into the air in the fuel chamber that is heated to a high temperature and is under pressure, causes an intermittent burning-off with the consequence of a steep increase in pressure with a high pressure peak and high $NO_x$ emission. A further disadvantage is that the discharge nozzle is directly in the fuel chamber and that because of the incomplete combustion, deposits are formed on the discharge nozzle.

In addition when the valve needle is closed, frequently there are drips, i.e. uncombusted fuel drops remain hanging on the valve needle. This leads to incomplete combustion and increased deposit on the discharge nozzle.

The aim of the invention is to produce an injection device of the type mentioned at the beginning, which causes an improvement in the combustion in the diesel engine by a continuous fairly quick and fairly thorough mixing of air and fuel and a smooth burning of the mixture.

To achieve this aim according to the invention, provision is made for this discharge nozzle to be surrounded by an ejection attachment which has an ejector duct leading from the nozzle outlet into the fuel chamber of the diesel engine, into which duct at least one lateral air duct opens, in such a way that the injection jet leaving the discharge nozzle entrains air from the air duct.

According to the invention, the fuel jet coming from the discharge nozzle is used to draw in highly compressed air so that a two phase mixture is formed in the entire fuel jet. This means that not only the jet peak is concerned with the formation of the mixture, but substantially the entire length of the fuel jet. Through the continuous depositing of air at a relatively slow speed compared to the fuel jet, an ignitable mixture is prepared with which intermittent burning-off is avoided. Hence a continuous, fairly quick and better mixture is achieved.

Through the continuous preparation of the mixture during the injection process, there are smooth increases in pressure and low pressure peaks. The $NO_x$ formation is reduced and hence the waste gases are fairly low in residue and there are fairly small deposits on the walls of the fuel chamber. The running of the diesel engine is quieter. With the ejector-injection device of the invention, in a diesel engine with direct injection the combustion and the running of the engine can be designed in a similarly smooth way as with a diesel engine with a precombustion chamber, but without having to put up with its disadvantages like e.g. fairly high fuel consumption.

A further advantage lies in the fact that during the injection process, the discharge nozzle is screened from the fuel chamber by the ejector attachment. This has the effect that the discharge nozzle is surrounded by the suction air for the duration of the injection process so that carbonisation of the discharge nozzle is avoided. In addition, with the intermittent closing of the valve needle through the suction effect of the air still present it means that the remaining residue fuels in the nozzle bore are drawn out and reach the fuel chamber during the combustion process.

According to an advantageous embodiment of the invention, the inlet of the air duct is connected to the fuel chamber. This means that the fuel jet draws off the compressed and heated air from the fuel chamber and mixes with this.

The discharge nozzle can have a Laval widening and in this way can be operated like a supersonic nozzle.

According to a preferred embodiment of the invention, the ejector duct connected to the opening of the air duct is made to be constricted to form a mixing nozzle. The ejector duct can be constructed in the flow direction behind the mixing nozzle as a widening diffusor. By suitable construction and dimensioning of the ejector duct, so much energy is drawn off the injection jet in the ejector through the drawn-in air that there are no compression shocks when the fuel enters the fuel chamber.

The invention is not limited to injection devices with a single discharge nozzle, but the nozzle body can also be provided with several discharge nozzles, whereby the ejector attachment for each discharge nozzle has its own ejector duct into which lateral air ducts open.

The advantages of the shielding of the fuel chamber and the flowing of the suction jet entering the ejector duct round the discharge nozzle are also valid for injection devices of stationary injection systems. In particular, because of the shorter time period for the mixture preparation the fuel chamber can be made shorter.

Figure 2:
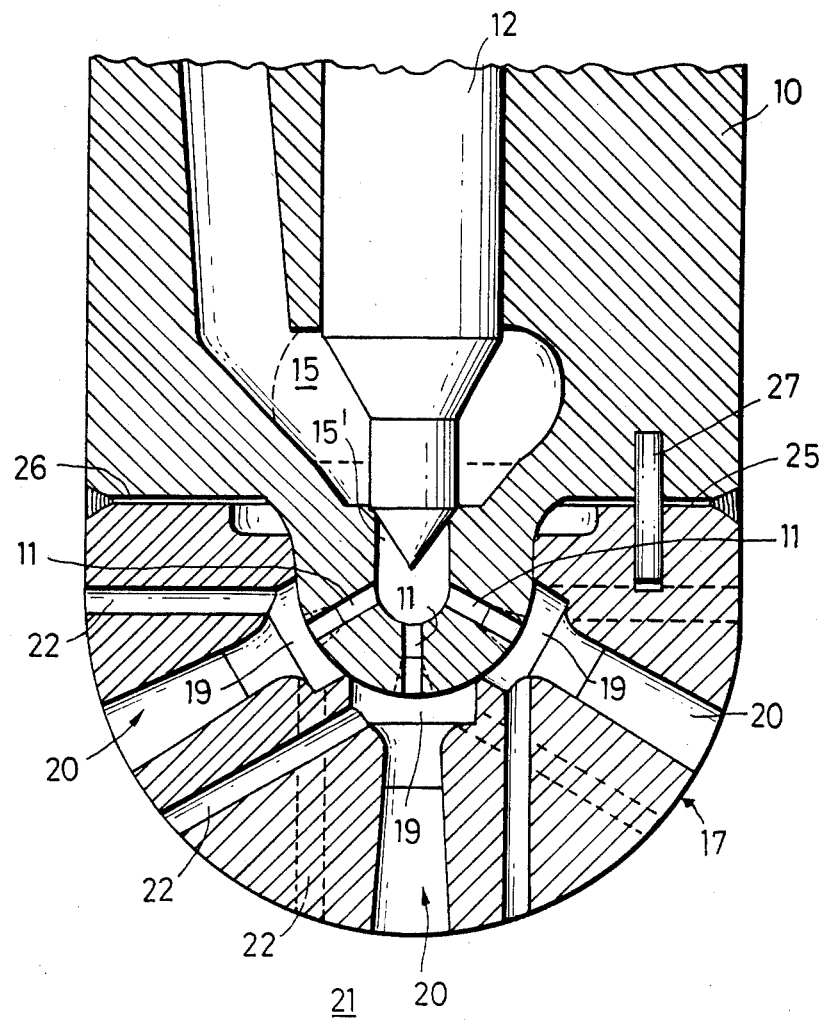
Figure 3:
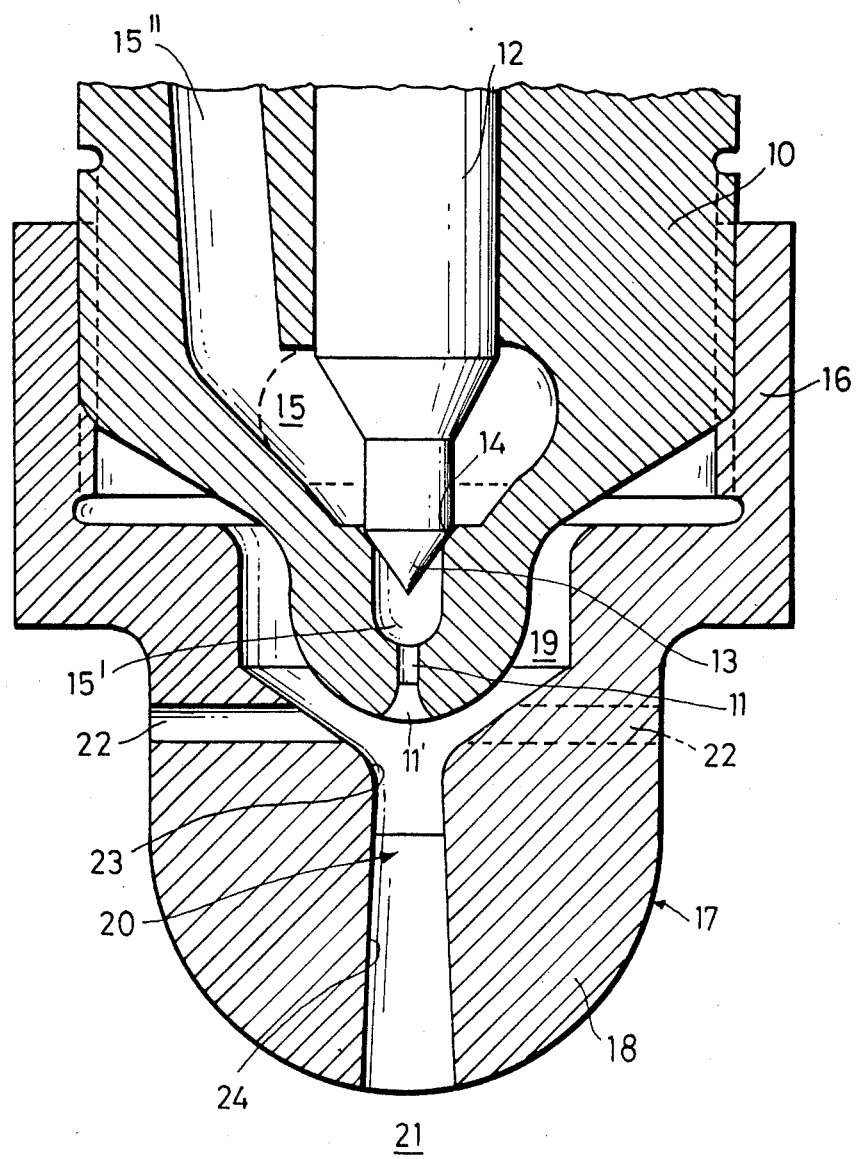

Two embodiments of the invention are more clearly described below with reference to the drawings. They show:

FIG. 1 a longitudinal section through an injection device with a single discharge nozzle FIG. 2 a longitudinal section through an injection device with several discharge nozzles, and FIG. 3 is a longitudinal section of the device of FIG. 1 modified to include a Laval nozzle.

In the embodiment of FIG. 1 there is provided a nozzle body 10 which tapers at its front end and has a discharge nozzle 11 at this front end. In the nozzle body 10 there is the valve needle 12 that is displaceable in the longitudinal direction, the front point 13 of which presses in the closed state against a seat 14, in the front area 15' of the fuel duct 15 and thus closes the fuel duct 15. The fuel duct 15 has a rear section 15" which runs laterally near the bore for the valve needle 12, and when the valve needle 12 is withdrawn, is connected to the section 15'.

Onto an outer thread of the nozzle body 10 there is screwed a bushing 16 of the ejector attachment 17 provided with an internal thread. The ejector attachment 17 has a hood 18 which surrounds the front end of the nozzle body 10 with the discharge nozzle 11 like a shield. In this hood 18 there is a hollow chamber 19, the walls of which are at a distance from the front part of the nozzle body 10. From the hollow chamber 19, the ejector duct 20 runs as an extension of the longitudinal axis of the discharge nozzle 19 into the fuel or combusion chamber 21.

Leading into the hollow chamber 19, at approximately the same level as the opening of the discharge nozzle 11, are lateral air ducts 22 which are in the form of slots. Connected to the openings of the air ducts 22, at the beginning of the ejector duct 20, is its greatest constriction so that this area is constructed as a mixing nozzle 23 for the mixture jet. The area of the ejector duct 20 adjoining the mixing nozzle 23 is constructed as a diffusor 24 with a constantly widening cross section. The diffusor 24 opens into the fuel chamber 21. The inlet apertures of the air ducts 22 are also connected to the fuel chamber 21. The upper wall of the fuel chamber 21 closes in seal tight manner with the bushing 16 of the ejector attachment 17.

The injection jet leaves from the discharge nozzle 11. Thus the injection jet draws in highly compressed air from the air ducts 22. Because of the suction effect of the injection jet, the drawn-air is accelerated and is conveyed at a high speed together with the fuel through the mixing nozzle 23 and the diffusor 24 into the fuel chamber 21.

With a free gas amount of only 2% in the volume of the fuel, the flow can already no longer be regarded as a liquid flow with a sound velocity $a > 1000$ m/s, but the mathematical requirements for a two phase flow with a sound velocity $a < 1000$ m/s apply. The discharge nozzle 11 can, if need be, be provided with a Laval widening 11' and operated as a supersonic nozzle, as shown in FIG. 3.

With the embodiment of FIG. 2, those elements which have the same function as in the embodiment of FIG. 1 are provided with the same references as in FIG. 1. The injection device according to FIG. 2 differs from that of FIG. 1 in the first place by the fact that instead of a single discharge nozzle 11, several discharge nozzles 11 are provided, and in that the ejector attachment accordingly also has several hollow chambers 19 shielded from one another, and ejector ducts 20 proceeding from them. Each ejector duct 20 consists here also of a mixing nozzle and a diffusor. The individual discharge nozzles 11 leave in different directions from the section 15' of the fuel duct 15 lying behind the point of the valve needle 12. The ejector ducts 20 are respectively directed axially to the associated discharge nozzle 11.

With the embodiment shown, the ejector attachment 17 has the shape of a spherical segment, the rear wall 25 of which is placed surface-wise against an annular collar 26 of the nozzle body 10. The ejector attachment 17 is firmly connected to the nozzle body 10 by welding. This connection could also be effected in another way, e.g. by screws.

In order to achieve an exact alignment of the ejector attachment 17 with respect to the nozzle body 10 there is provided a guide element 27 in the form of a fitting pin which projects into corresponding bores in the surfaces 25 and 26. Thus the manufacture and assembly of the ejector attachment 17 ensures that the axes of the discharge nozzles 11 and the ejector ducts 20 correspond exactly with one another.

Through the air ducts 22, highly compressed air is drawn off from the fuel chamber 21 by the driving jets, and is supplied via the suction chambers 19 to the ejector ducts 20. In the mixing nozzles of the ejector ducts, the drawn-in air is accelerated by the driving jets in order to enter again through the diffusors together with the driving fuel into the fuel chamber 21.

According to the invention, the ejector attachment—and the ejector channel 20 accordingly—form part of the nozzle body 10. Due to the ejector attachment, the volume of the fuel chamber is not increased so that no additional dead volume is created by the ejector—by contrast, the dead volume is even decreased.

It is possible, according to the invention, while maintaining the fuel chamber shape and without increasing the dead volume, to cause the pulse of the injected fuel to deeply penetrate into the fuel chamber 21, while air from the cylinder chamber is absorbed at the same time. The injection jet entrains the air to the bottom of the fuel chamber thus currently enriching with fresh air the fuel jet discharged from the injection bore and bringing about a perfect intermixture. The mixture is not ignited in the ejector channel 20, but in the fuel chamber 21 subsequent to the ejector channel.

I claim:

1. An injection device for a diesel engine having a combustion chamber, in particular a diesel engine with direct injection, the injection device having a nozzle body which has a duct that is blockable and releasable by a controlledly movable valve needle, wherein the nozzle body duct opens into at least one discharge nozzle, the improvement wherein the nozzle is surrounded by an ejector attachment which has (a) a mixing duct oriented axially with respect to the discharge nozzle, and leading from the discharge nozzle outlet into the combustion chamber, and (b) at least one lateral air duct opening leading from the combustion chamber into the mixing duct, whereby the injection jet leaving the discharge nozzle entrains air drawn in by suction from the combustion chamber via the air duct.

2. An injection device according to claim 1, wherein the inlet of the air duct is connected to the combustion chamber.

3. Injection device according to claim 1, wherein the discharge nozzle has a Laval widening.

4. Injection device according to claim 1, wherein the mixing duct connected to the opening of the air duct is made to be constricted to form a mixing nozzle.

5. Injection device according to claim 4, wherein the mixing duct in the flow direction downstream from the mixing nozzle is constructed as a widening diffuser.

6. Injection device according to claim 1, wherein the ejector attachment has a spherical segment surrounding the front end of the nozzle body.

7. Injection device according to claim 1, wherein the ejector attachment is secured to the nozzle body with at least one paraxial guide element.

8. An injection device for facilitating the mixing of air and diesel fuel prior to combustion in a diesel engine combustion chamber, the diesel engine of the type having direct injection, the device comprising:
a nozzle body having an internal chamber and at least one outlet channel communicating with the internal chamber and having injection means for injecting diesel fuel through the outlet channel; and
a nozzle body jacket surrounding the nozzle body, the nozzle body jacket having at least one mixing channel communicating at one end with the outlet channel and communicating at the other end with the combustion chamber and having at least one air channel communicating at one end with the mixing channel and communicating at the other end with the combustion chamber, the mixing channel being oriented axially with respect to the outlet channel, wherein the fuel injected through the outlet channel into the mixing channel by operation of the injection means entrains air from the combustion chamber via the air channel such that a mixture of air and fuel is delivered to the combustion chamber through the mixing channel.

9. An injection device for facilitating the mixing of air and diesel fuel prior to combustion in a diesel engine conductive chamber according to claim 8 wherein the injection means comprises:
   a valve channel communicating at one end with said internal chamber;
   a fuel channel adjacent to the valve channel, and communicating at one end with the valve channel; and
   a valve needle adapted for reciprocal movement within the valve channel and adapted to block the flow of fuel from the fuel channel to the internal chamber, the valve needle having an end portion disposed within the internal chamber when the flow of fuel is blocked.

10. An injection device for facilitating the mixing of air and diesel fuel prior to combustion in a diesel engine combustion chamber according to claim 8, wherein delivery of fuel from the internal chamber to the combustion chamber results in a two-phase mixture of air and fuel being forced along substantially the entire length of the mixing channel.

11. Injection device for a diesel engine, in particular a diesel engine with direct injection, the injection device having a nozzle body which has a duct that is blockable and releasable by a controlledly movable valve needle, the improvement wherein the nozzle body duct opens into several discharge nozzles, the discharge nozzles being surrounded by an ejector attachment, the ejector attachment having for each discharge nozzle (a) an ejector duct leading from the discharge nozzle outlet into the fuel chamber and (b) at least one lateral air duct opening into the ejector duct, wherein the injection jet leaving the discharge nozzles entrains air from the air ducts.

12. A device for facilitating the mixing of air and diesel fuel prior to combustion in a diesel engine fuel chamber comprising:
   a nozzle body having an internal chamber, a multiplicity of outlet channels each communicating with the internal chamber, and means for delivering diesel fuel to the internal chamber and subsequently to the outlet channels; and
   a nozzle body jacket coupled to the nozzle body, the nozzle body jacket having (a) a multiplicity of mixing channels each communicating at one end with an outlet channel and at the other end with the fuel chamber and (b) a multiplicity of air channels each communicating at one end with a mixing channel and at the other end with an air source,
   wherein the fuel passing through the outlet channels into the mixing channels draws air from the air channel such that a mixture of air and fuel are delivered to the fuel chamber.

13. A device for facilitating the mixing of air and diesel fuel prior to combustion in a diesel engine fuel chamber according to claim 12, wherein each of the outlet channels communicates with a corresponding mixing channel, and the corresponding mixing channel communicates with one end of the corresponding air channel.

14. An injection device for a diesel engine having a combustion chamber, in particular a diesel engine with direct injection, the injection device having a nozzle body which has a duct that is blockable and releasable by a controlledly movable valve needle, wherein the nozzle body duct opens into at least one discharge nozzle, the improvement wherein the discharge nozzle is surrounded by an ejector attachment which has (a) a mixing duct oriented axially with respect to the discharge nozzle, and leading from the discharge nozzle outlet into the combustion chamber, (b) at least one lateral air duct means, opening into the mixing duct, for providing into the mixing duct air at substantially the same pressure as at the outlet of the mixing duct in the combustion chamber, whereby the injection jet leaving the discharge nozzle entrains air drawn in by suction from the combustion chamber via the air duct into the mixing duct.

15. An injection device for a diesel engine having a combustion chamber, in particular a diesel engine with direct injection, the injection device having a nozzle body which has a duct that is blockable and releasable by a controlledly movable valve needle, wherein the nozzle body duct opens into at least one discharge nozzle, the improvement wherein the discharge nozzle is surrounded by an ejector attachment which has (a) a mixing duct oriented axially with respect to the discharge nozzle, and leading from the discharge nozzle outlet into the combustion chamber, the mixing duct having a narrowed region to assist in producing a suction effect and having a constantly widening cross-section between the narrowed region and the combustion chamber, and (b) at least one lateral air duct opening for providing air into the mixing duct, the total area of the opening or openings being smaller than the area of the narrowed region of the mixing duct, such that the injection jet leaving the discharge nozzle entrains air drawn in by suction via the air duct.

16. An injection device for facilitating the mixing of air and diesel fuel prior to combustion in a diesel engine combustion chamber, the diesel engine of the type having direct injection, the device comprising:
   a nozzle body having an internal chamber and at least one outlet channel communicating with the internal chamber and having injection means for injecting diesel fuel through the outlet channel; and
   a nozzle body jacket surrounding the nozzle body, the nozzle body jacket having (a) at least one mixing channel communicating at one end with the outlet channel and communicating at the other end with the combustion chamber, the mixing channel having a narrowed region, and (b) at least one air channel communicating at one end with the mixing channel and communicating at the other end with an air source, the mixing channel being oriented axially with respect to the outlet channel, the total cross-sectional area of the air channel or channels at the mixing channel end being smaller than the cross-sectional area of said mixing channel narrowed region, wherein the fuel injected through the outlet channel into the mixing channel by operation of the injection means entrains air drawn in by suction from the air channel such that a mixture of air and fuel is delivered to the combustion chamber.

17. An injection device according to claim 16 wherein the mixing channel has a constantly widening cross-section between the narrowed region and the combustion chamber.

18. An arrangement for a diesel fuel injection device having at least one discharge nozzle thorough which fuel is delivered under pressure, comprising an ejector attachment mounted between the discharge nozzle and a combustion chamber and having (a) at least one conical mixing channel through the ejector attachment leading from the discharge nozzle outlet to the combustion chamber, and (b) at least one air channel through the ejector attachment leading from the combustion chamber to the mixing channel, the outlet of the air channel being in close proximity to the narrow end of the conical mixing channel, such that air from the combustion chamber will be entrained by a jet of fuel leaving the discharge nozzle into the mixing channel.

19. Injection device for a diesel engine having a combustion chamber, in particular a diesel engine with direct injection, the injection device having a nozzle body which has a duct that is blockable and releasable by a controlledly movable valve needle, wherein the nozzle body duct opens into at least one discharge nozzle, the improvement wherein the nozzle is surrounded by an ejector attachment which has (a) a hood surrounding the end of the nozzle body within which is a hollow suction chamber having walls which are at a small distance from the front part of the nozzle body, (b) a mixing duct oriented axially with respect to the discharge nozzle, and leading from the hollow suction chamber into the combustion chamber, and (c) at least one lateral air duct opening leading from the combustion chamber into the hollow suction chamber whereby the injection jet leaving the discharge nozzle entrains air drawn in by suction from the combustion chamber via the air duct into the mixing duct.

* * * * *